United States Patent
Wada et al.

(10) Patent No.: US 12,249,820 B2
(45) Date of Patent: Mar. 11, 2025

(54) ELECTRIC JUNCTION BOX

(71) Applicant: YAZAKI CORPORATION, Tokyo (JP)

(72) Inventors: Masahiro Wada, Makinohara (JP); Takaaki Kakimi, Makinohara (JP); Kazuki Shoji, Makinohara (JP); Kengo Aono, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 160 days.

(21) Appl. No.: 18/336,945

(22) Filed: Jun. 16, 2023

(65) Prior Publication Data

US 2024/0014642 A1 Jan. 11, 2024

(30) Foreign Application Priority Data

Jul. 6, 2022 (JP) ................... 2022-109234

(51) Int. Cl.
*H02G 3/08* (2006.01)

(52) U.S. Cl.
CPC .................. *H02G 3/083* (2013.01)

(58) Field of Classification Search
None
See application file for complete search history.

(56) References Cited

U.S. PATENT DOCUMENTS

| | | | | |
|---|---|---|---|---|
| 6,462,270 B1 * | 10/2002 | Depp | ..................... | H02G 3/081 174/59 |
| 2004/0029420 A1 * | 2/2004 | Yamaguchi | .......... | H01R 9/2466 439/76.2 |
| 2008/0293269 A1 * | 11/2008 | Kurizono | ............. | H01R 13/567 439/76.2 |
| 2013/0316550 A1 * | 11/2013 | Makino | ................... | B60R 16/02 439/76.2 |
| 2013/0319754 A1 * | 12/2013 | Makino | .................. | H01R 13/46 174/549 |
| 2014/0131061 A1 * | 5/2014 | Hirasawa | ............... | H02G 3/088 174/50 |
| 2014/0154896 A1 * | 6/2014 | Makino | .................. | H02G 3/088 439/76.2 |
| 2021/0218235 A1 | 7/2021 | Tashiro et al. | | |

FOREIGN PATENT DOCUMENTS

JP 2021-112065 A 8/2021

* cited by examiner

*Primary Examiner* — Krystal Robinson
(74) *Attorney, Agent, or Firm* — KENEALY VAIDYA LLP

(57) ABSTRACT

An electric junction box include a tubular frame portion having a main accommodating portion, and a cover portion attached to the frame portion so as to close an opening portion of the frame portion and having a through hole through which an electric wire coupled to the electronic component is inserted. The cover portion includes a first cover portion having a plate-shaped portion disposed to face an opening surface of the opening portion and a first side wall portion erected from a peripheral edge of the plate-shaped portion toward an opening edge of the opening portion, and a second cover portion having a second side wall portion disposed between at least a part of a erecting end of the first side wall portion and the opening edge of the opening portion and a sub accommodating portion provided inside the second side wall portion.

2 Claims, 5 Drawing Sheets

ELECTRIC JUNCTION BOX

CROSS-REFERENCE TO RELATED APPLICATIONS

This application is based on and claims priority under 35 USC 119 from Japanese Patent Application No. 2022-109234 filed on Jul. 6, 2022, the contents of which are incorporated herein by reference.

TECHNICAL FIELD

The present invention relates to an electric junction box in which an electronic component is accommodated.

BACKGROUND ART

In related art, there has been an electric junction box mounted on a vehicle, such as a relay box, which has therein an accommodation space for accommodating electronic components such as a relay or a fuse (see, for example, Patent Literature 1).

CITATION LIST

Patent Literature

Patent Literature 1: JP2021-112065A

SUMMARY OF INVENTION

Generally, the above-described type of electric junction box includes a tubular frame having therein a holding portion that holds an electronic component, an upper cover that closes an upper opening portion of the frame, and a lower cover that closes a lower opening portion of the frame. The lower cover is manufactured by, for example, integrally injection-molding a resin material in order to prevent water from entering the electric junction box when the electric junction box is wet from below. This is because if the lower cover is formed by combining a plurality of members, water may enter the inside of the lower cover through a gap between the members.

However, when the lower cover is integrally injection-molded, it is difficult to mold a complicated structure inside the lower cover from the viewpoint of simplifying a structure of a molding die as much as possible while avoiding so-called undercut. Therefore, the inside of the lower cover is generally a simple cavity. The cavity is used to guide an electric wire coupled to the electronic component into and out of the lower cover. However, from the viewpoint of downsizing and multi-functionality of the electric junction box, it is desired to further effectively use an inner space of the lower cover.

An object of the present invention is to provide an electric junction box in which an inner space of a cover portion of an electric junction box can be effectively used.

In order to achieve the object described above, an electric junction box according to the present invention is characterized as follows.

An electric junction box of the present invention includes a tubular frame portion having a main accommodating portion configured to accommodate an electronic component; and a cover portion attached to the frame portion so as to close an opening portion of the frame portion, and having a through hole through which an electric wire coupled to the electronic component is inserted.

The cover portion includes a first cover portion having a plate-shaped portion disposed to face an opening surface of the opening portion and a first side wall portion erected from a peripheral edge of the plate-shaped portion toward an opening edge of the opening portion, and a second cover portion having a second side wall portion disposed between at least a part of a erecting end of the first side wall portion and the opening edge of the opening portion, and a sub accommodating portion provided inside the second side wall portion and configured to accommodate another electronic component.

According to the connection structure of the present invention, the cover portion (for example, the lower cover) that closes the opening portion of the frame portion having the main accommodating portion capable of accommodating the electronic component includes the first cover portion and the second cover portion. The first cover portion includes the plate-shaped portion (for example, a bottom plate) and the first side wall portion. The second cover portion includes the second side wall portion disposed between at least the part of the erecting end of the first side wall portion of the first cover portion and the opening edge of the opening portion of the frame portion, and the sub accommodating portion capable of accommodating another electronic component. Both of the first cover portion and the second cover portion can be formed in a shape that avoids undercut during injection molding using a molding die in terms of the structure. Further, there is no gap between members of the first cover portion and the second cover portion in the plate-shaped portion (for example, a bottom plate) of the first cover portion in which water is most likely to enter when the electric junction box is exposed to water. Accordingly, not only the inside of the frame portion can be used as the main accommodating portion, but also the inside of the second side wall portion can be used as the sub accommodating portion without excessively impairing waterproof performance of the electric junction box. For example, a joint connector or the like can be accommodated in the sub accommodating portion. As described above, the electric junction box having the present configuration can effectively use the inner space of the cover portion of the electric junction box.

DESCRIPTION OF EMBODIMENTS

Embodiment

Figure 1:
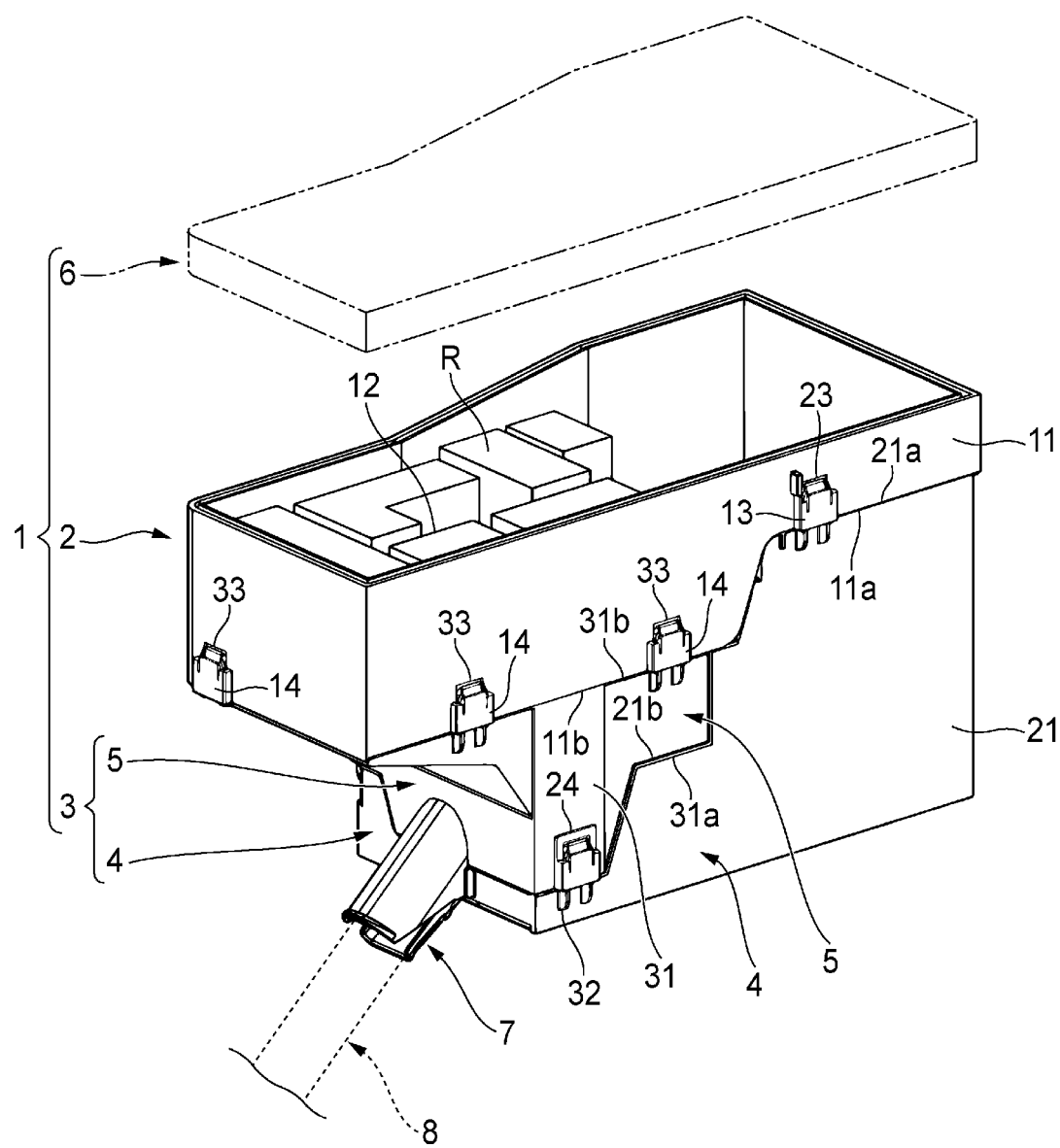
FIG. 1 is a perspective view of an electric junction box according to an embodiment of the present invention.
Figure 1:
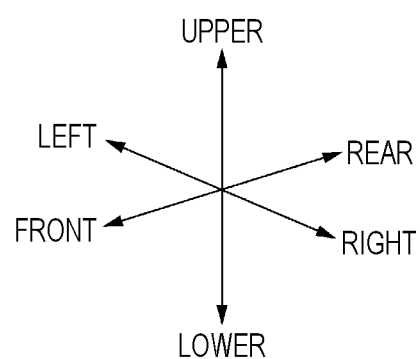

Hereinafter, an electric junction box 1 according to an embodiment of the present invention shown in FIG. 1 will be described with reference to the drawings. The electric junction box 1 is typically a relay box that is mounted on a vehicle and has an internal space for accommodating electronic components R (see FIGS. 1 and 2) such as a relay and other components. Hereinafter, for convenience of description, "front", "rear", "left", "right", "upper", and "lower" are defined as shown in FIG. 1. A "front-rear direction", a "left-right direction", and an "upper-lower direction" are orthogonal to one another. When the electric junction box 1 is mounted on a vehicle, the "front-rear direction", the "left-right direction", and the "upper-lower direction" respectively correspond to a front-rear direction, a left-right direction, and an upper-lower direction of the vehicle. A side facing the inside of the electric junction box 1 is referred to as an "inner" side, and a side facing the outside of the electric junction box 1 is referred to as an "outer" side.

Figure 2:
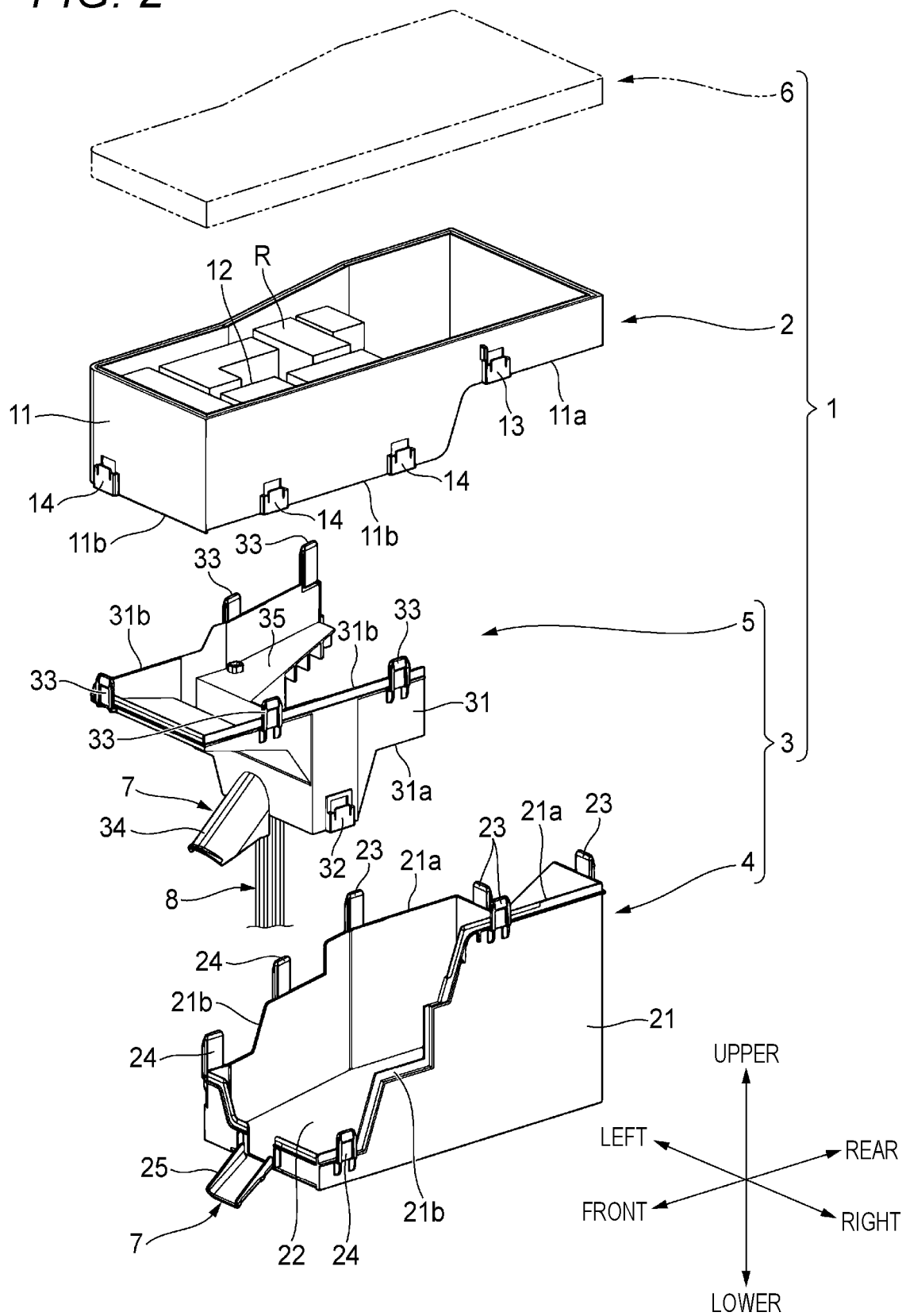
FIG. 2 is an exploded perspective view of the electric junction box shown in FIG. 1.

As shown in FIGS. 1 and 2, the electric junction box 1 includes a frame 2, a lower cover 3 assembled below the frame 2 so as to close a lower end opening of the frame 2, and an upper cover 6 assembled above the frame 2 so as to close an upper end opening of the frame 2. The lower cover 3 is formed by combining a first cover portion 4 and a second cover portion 5. The frame 2, the lower cover 3 (the first cover portion 4 and the second cover portion 5), and the upper cover 6 constituting the electric junction box 1 are all resin molded bodies.

In the electric junction box 1, as shown in FIG. 1, a plurality of electric wires 8 electrically coupled to some of a plurality of electronic components R positioned inside the electric junction box 1 are led out to the outside of the electric junction box 1 via an electric wire lead-out hole 7. Hereinafter, configurations of the frame 2, the lower cover 3, and the upper cover 6 constituting the electric junction box 1 will be described in order.

First, the frame 2 will be described. As shown in FIGS. 1 and 2, the frame 2 includes a substantially rectangular tubular side wall portion 11 that extends in the upper-lower direction and is long in the front-rear direction. The side wall portion 11 constitutes a major part of an external appearance for an upper portion of a side face of the electric junction box 1. Of a substantially rectangular frame-shaped lower end edge portion of the side wall portion 11, a substantially U-shaped portion (lower end edge portion 11a) on a rear side is fitted to an upper end edge portion 21a (see FIG. 2 and the like) of the first cover portion 4 of the lower cover 3, which will be described later, and a substantially U-shaped portion (lower end edge portion 11b) on a front side is fitted to an upper end edge portion 31b (see FIG. 2 and the like) of the second cover portion 5 of the lower cover 3, which will be described later. As shown in FIGS. 1 and 2, an accommodating portion 12 that accommodates a plurality of electronic components R and other components is provided inside the side wall portion 11.

Locked portions 13 each including a through hole extending in the upper-lower direction are integrally provided on an outer surface at a plurality of positions (four positions in this example) of the lower end edge portion 11a of the side wall portion 11 in a peripheral direction (see FIGS. 1 and 2). The locked portions 13 have a function of assembling the first cover portion 4 of the lower cover 3 to the frame 2. Similarly, locked portions 14 each including a through hole extending in the upper-lower direction are integrally provided on an outer surface at a plurality of positions (five positions in this example) of the lower end edge portion 11b of the side wall portion 11 in the peripheral direction (see FIGS. 1 and 2). The locked portions 14 have a function of assembling the second cover portion 5 of the lower cover 3 to the frame 2. Further, locking pieces (not shown) extending upward are integrally provided at a plurality of positions in the upper end edge portion of the side wall portion 11 in the peripheral direction. The locking pieces have a function of assembling the upper cover 6 to the frame 2.

Next, the first cover portion 4 of the lower cover 3 will be described. As shown in FIGS. 1 and 2, the first cover portion 4 integrally includes a side wall portion 21 which has a substantially rectangular frame shape and constitutes a major part of an external appearance for a lower portion of the side face of the electric junction box 1, and a bottom wall portion 22 which closes an annular lower end opening of the side wall portion 21 and constitutes the entire external appearance of a bottom surface of the electric junction box 1. The side wall portion 21 is erected upward from a peripheral edge of the bottom wall portion 22 over the entire periphery in the peripheral direction. The bottom wall portion 22 is disposed to face the lower end opening of the frame 2. The first cover portion 4 has a shape that avoids undercut during injection molding in the upper-lower direction.

A substantially U-shaped portion (the upper end edge portion 21a) on the rear side of the substantially rectangular frame-shaped upper end edge portion of the side wall portion 21 has a shape corresponding to the lower end edge portion 11a of the frame 2, and is fitted to the lower end edge portion 11a of the frame 2. A substantially U-shaped portion (the upper end edge portion 21b) on the front side of the substantially rectangular frame-shaped upper end edge portion of the side wall portion 21 has a shape corresponding to a lower end edge portion 31a of the second cover portion 5 to be described later, and is fitted to the lower end edge portion 31a of the second cover portion 5. The upper end edge portion 21b is positioned lower than the upper end edge portion 21a by a height of the second cover portion 5 (more specifically, a side wall portion 31 to be described later).

Locking pieces 23 extending upward are integrally provided on an outer surface at a plurality of positions (four positions in this example) on the upper end edge portion 21a of the side wall portion 21 in the peripheral direction so as to correspond to the plurality of locked portions 13 of the frame 2 (see FIG. 2). Similarly, locking pieces 24 extending upward are integrally provided on an outer surface at a plurality of positions (three positions in this example) on the upper end edge portion 21b of the side wall portion 21 in the peripheral direction so as to correspond to a plurality of locked portions 32 of the second cover portion 5, which will be described later (see FIG. 2).

At a position corresponding to the electric wire lead-out hole 7 (see FIG. 1) in the side wall portion 21, a semi-cylindrical gutter-shaped portion 25 that is open upward is provided to extend obliquely in a front lower direction (see FIG. 2). The gutter-shaped portion 25 has a function of forming a lower part of an inner wall defining the electric wire lead-out hole 7.

Next, the second cover portion 5 of the lower cover 3 will be described. As shown in FIGS. 1 to 4, the second cover portion 5 has the side wall portion 31 forming a part (front part) of the external appearance for the lower portion of the side face of the electric junction box 1. The side wall portion 31 has a substantially U-shape opening rearward when viewed in the upper-lower direction. Similarly to the first cover portion 4, the second cover portion 5 also has a shape that avoids undercut during injection molding in the upper-lower direction.

The lower end edge portion 31a of the side wall portion 31 has a shape corresponding to the upper end edge portion 21b of the first cover portion 4, and is fitted to the upper end edge portion 21b of the first cover portion 4. The upper end edge portion 31b of the side wall portion 31 has a shape corresponding to the lower end edge portion 11b of the frame 2, and is fitted to the lower end edge portion 11b of the frame 2.

The locked portions 32 each including a through hole extending in the upper-lower direction are integrally provided on an outer surface at a plurality of positions (three positions in this example) of the lower end edge portion 31a of the side wall portion 31 in the peripheral direction so as to correspond to the plurality of locking pieces 24 of the first cover portion 4 (see FIGS. 1 to 4). Locking pieces 33 extending upward are integrally provided on an outer surface at a plurality of positions (five positions in this example) on the upper end edge portion 31b of the side wall portion 31 in the peripheral direction so as to correspond to the plurality of locked portions 14 of the frame 2 (see FIG. 2).

At a position corresponding to the electric wire lead-out hole 7 (see FIG. 1) in the side wall portion 31, a semi-cylindrical gutter-shaped portion 34 that is open downward is provided to extend obliquely in the front lower direction (see FIG. 2). The gutter-shaped portion 34 has a function of forming a lower part of the inner wall defining the electric wire lead-out hole 7.

Figure 3:
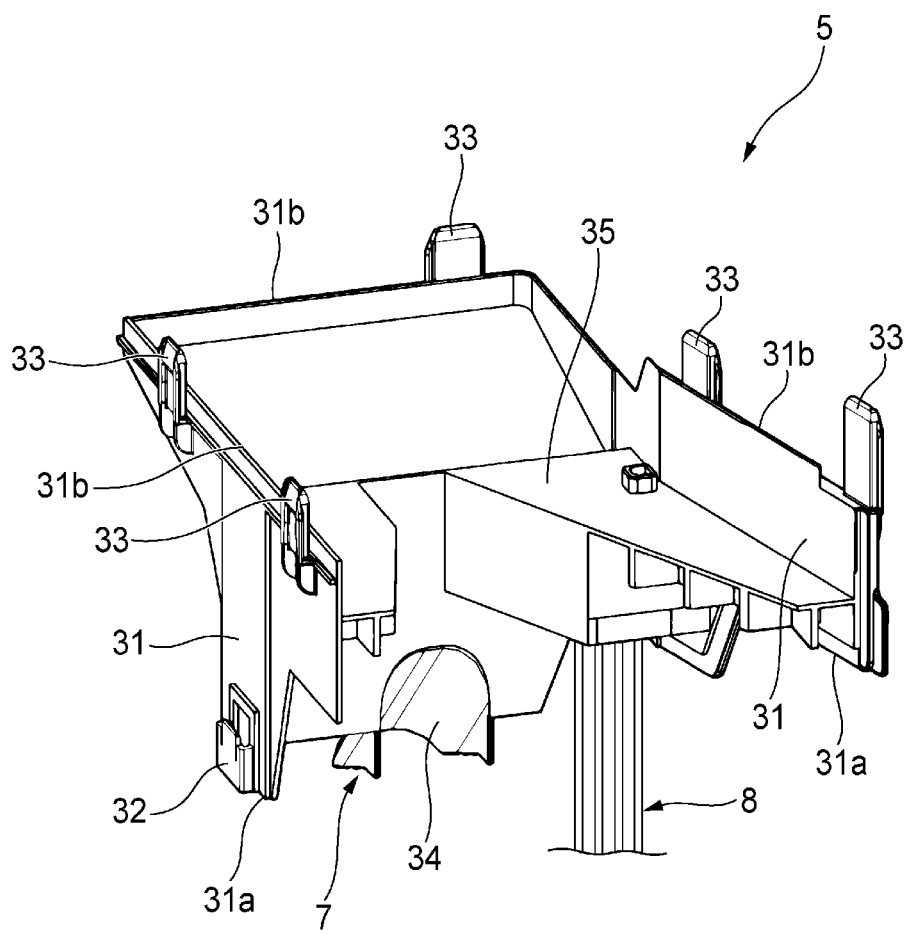
FIG. 3 is a perspective view of a lower cover shown in FIG. 2.
Figure 3:
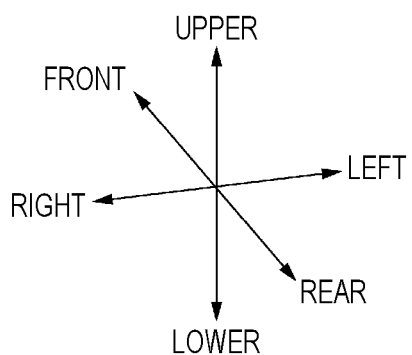
Figure 4:
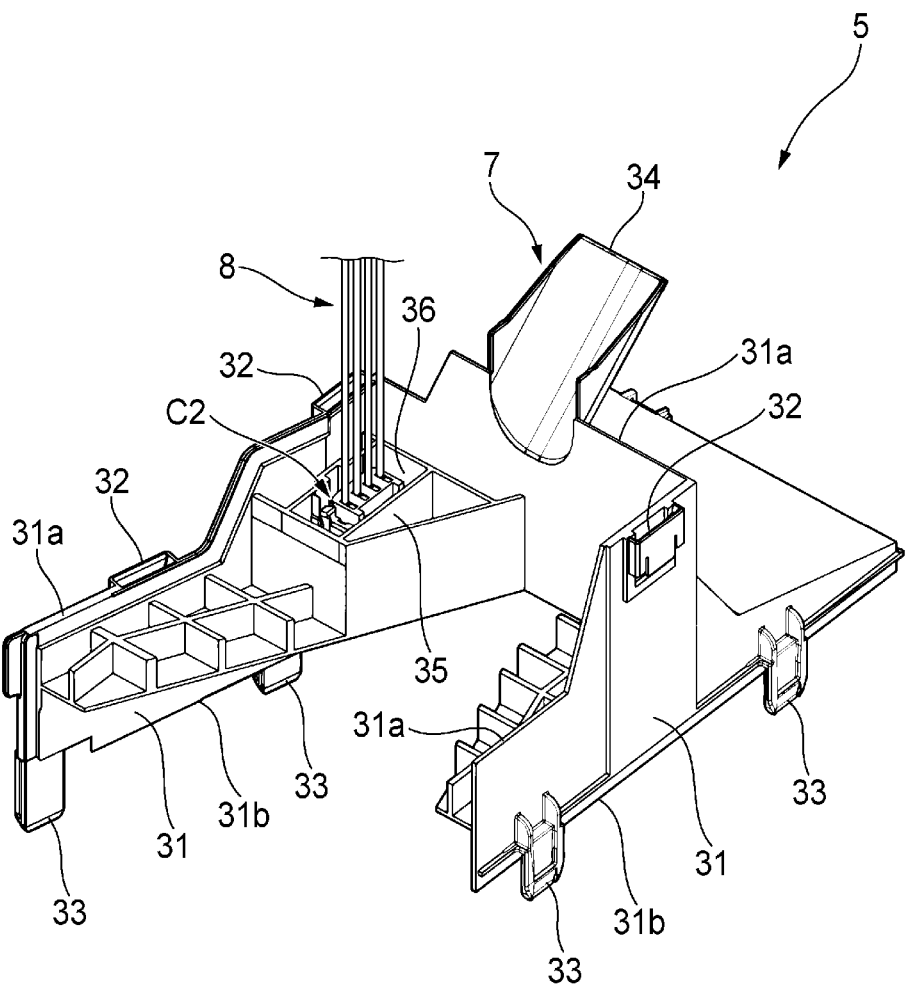
FIG. 4 is a perspective view of the lower cover shown in FIG. 2 as viewed upside down.
Figure 4:
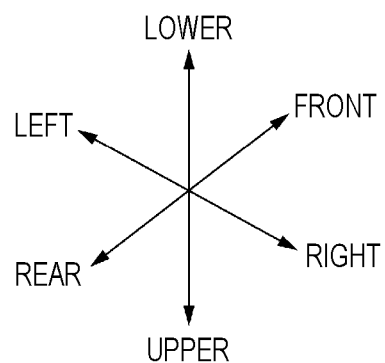
Figure 5:
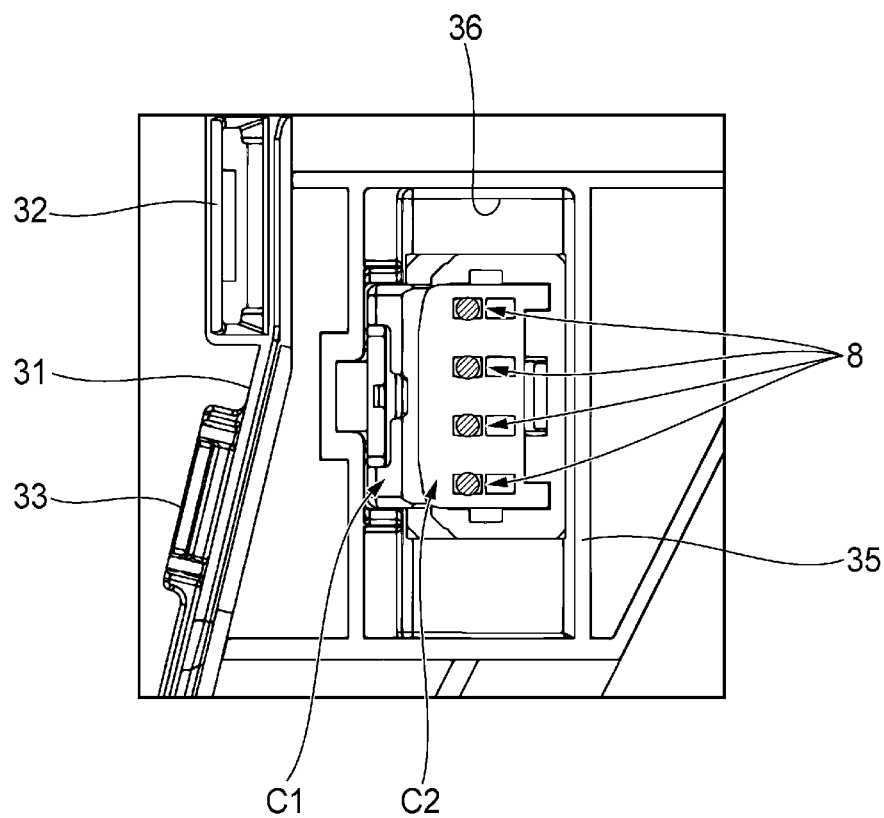
FIG. 5 is a bottom view showing a periphery of a fitting position of a counterpart connector and a joint connector accommodated in an accommodation recessed portion of the lower cover shown in FIG. 2.
Figure 5:
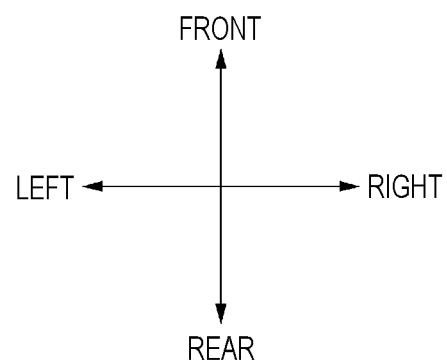

As shown in FIGS. 2 to 4, an accommodating portion 35 is integrally provided at a position in the vicinity of the gutter-shaped portion 34 on an inner wall of the side wall portion 31, and is protruding inward. As shown in FIGS. 4 and 5, an accommodation recessed portion 36 recessed upward is formed in a lower face of the accommodating portion 35. A joint connector C1 (see FIG. 5) is accommodated in the accommodation recessed portion 36. A counterpart connector C2 (see FIGS. 4 and 5) is fitted into a fitting portion of the joint connector C1 facing downward from below. A plurality of (four) electric wires 8 extend downward from the counterpart connector C2 (see FIGS. 4 and 5).

By being fitted with the counterpart connector C2 (see FIGS. 4 and 5), the joint connector C1 exhibits a function of electrically coupling a plurality of circuits respectively coupled to the plurality of electric wires 8 coupled to the counterpart connector C2. The joint connector C1 includes, for example, a bus bar (not shown) including a plurality of pin terminals for fitting and coupling to counterpart terminals provided at ends of the plurality of electric wires 8 coupled to the counterpart connector C2, an inner housing (not shown) holding the bus bar, and an outer housing (not shown) accommodating a ferrite plate (not shown) for noise removal and to which the inner housing is assembled.

Next, the upper cover 6 will be described. The upper cover 6 integrally includes a side wall portion in a substantially rectangular frame shape having a shape corresponding to an upper end edge portion in a substantially rectangular frame shape of the frame 2, and a top wall portion that closes an upper end opening in a substantially rectangular frame shape of the side wall portion (not shown). Locked portions (not shown) each including a through-hole extending in the upper-lower direction are integrally provided on an outer surface at a plurality of positions in the peripheral direction of a lower end edge portion of the side wall portion of the upper cover 6 so as to correspond to the plurality of locking pieces (not shown) of the frame 2. The configurations of the frame 2, the lower cover 3 (the first cover portion 4 and the second cover portion 5), and the upper cover 6 constituting the electric junction box 1 have been described above.

In order to assemble the electric junction box 1 including the frame 2, the lower cover 3 (the first cover portion 4 and the second cover portion 5), and the upper cover 6, it is necessary to assemble the upper cover 6 to the frame 2 and to assemble the lower cover 3 to the frame 2.

In order to assemble the upper cover 6 to the frame 2, the substantially rectangular frame-shaped lower end edge portion of the side wall portion of the upper cover 6 is fitted to the substantially rectangular frame-shaped upper end edge portion of the side wall portion 11 of the frame 2, and the plurality of locking pieces of the frame 2 are locked to the plurality of locked portions of the upper cover 6. Accordingly, the assembly of the upper cover 6 to the frame 2 is completed.

In order to assemble the lower cover 3 to the frame 2, firstly, the first cover portion 4 and the second cover portion 5 are assembled to each other to form the lower cover 3. Specifically, the lower end edge portion 31a of the side wall portion 31 of the second cover portion 5 is fitted to the upper end edge portion 21b of the first cover portion 4 such that a portion in an extending direction of the plurality of electric wires 8 extending downward from the second cover portion 5 is sandwiched between the gutter-shaped portion 25 of the first cover portion 4 and the gutter-shaped portion 34 of the second cover portion 5, and the plurality of locking pieces 24 of the first cover portion 4 are locked to the plurality of locked portions 32 of the second cover portion 5. Accordingly, the upper end edge portion 21b of the first cover portion 4 and the lower end edge portion 31a of the second cover portion 5 are assembled to each other to define the substantially rectangular frame-shaped upper end edge portion of the lower cover 3 having a shape corresponding to the substantially rectangular frame-shaped lower end edge portion of the frame 2. Further, the gutter-shaped portion 25 of the first cover portion 4 and the gutter-shaped portion 34 of the second cover portion 5 define the electric wire lead-out hole 7 through which the plurality of electric wires 8 are inserted (see FIG. 1).

In the lower cover 3 configured by assembling the first cover portion 4 and the second cover portion 5 to each other, a boundary portion (gap) between the first cover portion 4 and the second cover portion 5 is present only on the side wall of the lower cover 3, and is not present on a bottom wall of the lower cover 3 (that is, the bottom wall portion 22 of the first cover portion 4) in which water is most likely to enter when the electric junction box is just exposed to water. Therefore, the possibility that water enters the inside of the electric junction box 1 when the electric junction box is exposed to water is not excessively increased. Further, the electric wire lead-out hole 7 through which the plurality of electric wires 8 are inserted opens in a side wall (a boundary portion between the first cover portion 4 and the second cover portion 5) of the lower cover 3. Accordingly, as compared with a case where the electric wire lead-out hole 7 is opened in the bottom wall of the lower cover 3 (that is, the bottom wall portion 22 of the first cover portion 4), it is possible to prevent water from entering the inside of the electric junction box when the electric junction box is exposed to water.

Next, the substantially rectangular frame-shaped lower end edge portion of the frame 2 is fitted to the substantially rectangular frame-shaped upper end edge portion of the lower cover 3, and the locking pieces 23 and 24 of the lower cover 3 are locked to the locked portions 13 and 14 of the frame 2, respectively. Accordingly, the assembly of the lower cover 3 to the frame 2 is completed.

In an assembled state of the electric junction box 1, the upper cover 6 is prevented from being separated upward from the frame 2 by the locking between the plurality of locked portions of the upper cover 6 and the plurality of locking pieces of the frame 2. The second cover portion 5 of the lower cover 3 is prevented from being separated downward from the frame 2 by the locking between the plurality of locked portions 14 of the frame 2 and the plurality of locking pieces 33 of the second cover portion 5. The first cover portion 4 of the lower cover 3 is prevented from being separated downward from the frame 2 by the locking between the plurality of locked portions 13 of the frame 2 and the plurality of locking pieces 23 of the first cover portion 4. The first cover portion 4 and the second cover portion 5 are prevented from being separated from each other in the upper-lower direction by the locking between the plurality of locked portions 32 of the second cover portion 5 and the plurality of locking pieces 24 of the first cover portion 4. Further, the plurality of electric wires 8 electrically coupled to some of the plurality of electronic components R positioned inside the electric junction box 1 (frame 2) are led out to the outside of the electric junction box 1 via the electric wire lead-out hole 7. Further, the entire side wall portion 31 of the second cover portion 5 is disposed between a part in the peripheral direction of an annular upper end edge portion of the side wall portion 21 of the first cover portion 4 and a part in the peripheral direction of an annular lower end edge portion of the side wall portion 11 of the frame 2.

Operations and Effects

As described above, according to the electric junction box 1 of the present embodiment, the lower cover 3 that closes the lower end opening of the frame 2 including the accommodating portion 12 capable of accommodating the electronic components R includes the first cover portion 4 and the second cover portion 5. The first cover portion 4 includes the side wall portion 21 and the bottom wall portion 22. The second cover portion 5 includes the side wall portion 31 disposed between the upper end edge portion 21b of the side wall portion 21 of the first cover portion 4 and the lower end edge portion 11b of the frame 2, and the accommodating portion 35 (accommodation recessed portion 36) capable of accommodating the joint connector C1. Both of the first cover portion 4 and the second cover portion 5 have a shape that avoids undercut during injection molding in the upper-lower direction. Further, there is no gap between members of the first cover portion 4 and the second cover portion 5 in the bottom wall portion 22 of the first cover portion 4 in which water is most likely to enter when the electric junction box is exposed to water. Accordingly, not only the inside of the frame 2 can be used as the accommodating portion 12, but also the inside of the side wall portion 31 can be used as the accommodating portion 35 (accommodation recessed portion 36) without excessively increasing the possibility that water enters the inside of the electric junction box 1 when the electric junction box 1 is exposed to water. As described above, the electric junction box 1 according to the present embodiment can effectively use an inner space of the lower cover 3 of the electric junction box 1.

Further, the electric wire lead-out hole 7 through which the plurality of electric wires 8 coupled to the electronic components R are inserted is configured such that a part of the electric wire lead-out hole 7 is opened in the side wall portion 21 of the first cover portion 4 and the other part of the electric wire lead-out hole 7 is opened in the side wall portion 31 of the second cover portion 5. Accordingly, as compared with a case where the electric wire lead-out hole 7 opens in the bottom wall portion 22 of the first cover portion 4, it is possible to prevent the entry of water into the electric junction box 1 when the electric junction box 1 is exposed to water.

Other Embodiments

The present invention is not limited to the embodiment described above, and various modifications can be adopted within the scope of the present invention. For example, the present invention is not limited to the embodiment described above, and modifications, improvements, and the like can be made as appropriate. In addition, materials, shapes, dimensions, numbers, arrangement positions, and the like of the respective constituent elements in the above embodiment are optionally selected and are not limited as long as the present invention can be implemented.

In the above embodiment, the electric wire lead-out hole 7 through which the plurality of electric wires 8 coupled to the electronic components R are inserted is configured such that a part of the electric wire lead-out hole 7 is opened in the side wall portion 21 of the first cover portion 4 and the other part of the electric wire lead-out hole 7 is opened in the side wall portion 31 of the second cover portion 5. In this regard, the electric wire lead-out hole 7 may be open in only one of the side wall portion 21 of the first cover portion 4 and the side wall portion 31 of the second cover portion 5.

Further, in the above embodiment, the side wall portion 31 of the second cover portion 5 is disposed between the part in the peripheral direction of the annular upper end edge portion of the side wall portion 21 of the first cover portion 4 and the part in the peripheral direction of the annular lower end edge portion of the side wall portion 11 of the frame 2. In this regard, the side wall portion 31 of the second cover portion 5 may have a tubular shape, and may be disposed between the entire peripheral area of the annular upper end edge portion of the side wall portion 21 of the first cover portion 4 and the entire peripheral area of the annular lower end edge portion of the side wall portion 11 of the frame 2.

Further, in the above embodiment, the joint connector C1 is adopted as "other electronic components" accommodated in the accommodation recessed portion 36 of the second cover portion 5. In this regard, an electronic component other than the joint connector C1 may be adopted as the "other electronic components" accommodated in the accommodation recessed portion 36 of the second cover portion 5.

Further, in the above embodiment, the electric junction box 1 is a relay box (electric junction box) that accommodates a plurality of electronic components R, and the electric junction box 1 may be a structure having a function other than that of the relay box (electric junction box).

Here, characteristics of the embodiment of the electric junction box 1 according to the present invention described above will be briefly summarized and listed in [1] and [2] below.

[1] An electric junction box (1) including:
  a tubular frame portion (2) having a main accommodating portion (12) configured to accommodate an electronic component (R); and
  a cover portion (3) attached to the frame portion (2) so as to close an opening portion of the frame portion (2), and having a through hole (7) through which an electric wire (8) coupled to the electronic component (R) is inserted,
  in which the cover portion (3) includes
  a first cover portion (4) having a plate-shaped portion (22) disposed to face an opening surface of the opening portion and a first side wall portion (21) erected from a peripheral edge of the plate-shaped portion (22) toward an opening edge of the opening portion, and a second cover portion (5) having a second side wall portion (31) disposed between at least a part (21b) of a erecting end of the first side wall portion (21) and the opening edge (11b) of the opening portion, and a sub accommodating portion (36) provided inside the second side wall portion (31) and configured to accommodate another electronic component (C1).

According to the electric junction box having the configuration of [1], the cover portion (for example, the lower cover) that closes the opening portion of the frame portion having the main accommodating portion capable of accommodating the electronic component includes the first cover portion and the second cover portion. The first cover portion includes the plate-shaped portion (for example, a bottom plate) and the first side wall portion. The second cover portion includes the second side wall portion disposed between at least the part of the erecting end of the first side wall portion of the first cover portion and the opening edge of the opening portion of the frame portion, and the sub accommodating portion capable of accommodating another electronic component. Both of the first cover portion and the second cover portion can be formed in a shape that avoids undercut during injection molding using a molding die in terms of the structure. Further, there is no gap between members of the first cover portion and the second cover portion in the plate-shaped portion (for example, a bottom plate) of the first cover portion in which water is most likely to enter when the electric junction box is exposed to water. Accordingly, not only the inside of the frame portion can be used as the main accommodating portion, but also the inside of the second side wall portion can be used as the sub accommodating portion without excessively impairing waterproof performance of the electric junction box. For example, a joint connector or the like can be accommodated in the sub accommodating portion. As described above, the electric junction box having the present configuration can effectively use the inner space of the cover portion of the electric junction box.

[2] The electric junction box (1) according to [1], in which the through hole (7) is configured such that one part of the through hole (7) is opened in the first side wall portion (21) and the other part of the through hole (7) is opened in the second side wall portion (31), or the through hole (7) is opened in one of the first side wall portion (21) and the second side wall portion (31).

According to the electric junction box having the configuration of [2], the through hole through which the electric wire coupled to the electronic component is inserted is configured such that one part of the through hole is opened in the first side wall portion and the other part of the through hole is opened in the second side wall portion, or the through hole is opened in one of the first side wall portion and the second side wall portion. Accordingly, as compared with a case where the through hole is opened in the plate-shaped portion (for example, the bottom plate) of the first cover portion, it is possible to prevent the entry of water into the electric junction box when the electric junction box 1 is exposed to water.

What is claimed is:

1. An electric junction box comprising: a tubular frame portion having a main accommodating portion configured to accommodate an electronic component; and a cover portion attached to the tubular frame portion so as to close an opening portion of the tubular frame portion, and having a through hole through which an electric wire coupled to the electronic component is inserted, wherein the cover portion includes a first cover portion having a plate-shaped portion disposed to face an opening surface of the opening portion and a first side wall portion erected from a peripheral edge of the plate-shaped portion toward an opening edge of the opening portion, and a second cover portion having a second side wall portion disposed between at least a part of an erecting end of the first side wall portion and the opening edge of the opening portion, and a sub accommodating portion provided inside the second side wall portion and configured to accommodate another electronic component.

2. The electric junction box according to claim 1, wherein the through hole is configured such that one part of the through hole is opened in the first side wall portion and the other part of the through hole is opened in the second side wall portion, or the through hole is opened in one of the first side wall portion and the second side wall portion.

* * * * *